US012045330B2

(12) United States Patent
Jian et al.

(10) Patent No.: US 12,045,330 B2
(45) Date of Patent: Jul. 23, 2024

(54) FIXED-POINT AUTHORIZATION IDENTITY RECOGNITION METHOD AND APPARATUS, AND SERVER

(71) Applicant: XUNTENG (GUANGDONG) TECHNOLOGY CO., LTD., Guangzhou (CN)

(72) Inventors: Weiming Jian, Guangzhou (CN); Aiping Pi, Guangzhou (CN); Huagui Liang, Guangzhou (CN); Feiying Huang, Guangzhou (CN); Qiurong Chen, Guangzhou (CN)

(73) Assignee: XUNTENG (GUANGDONG) TECHNOLOGY CO, LTD., Guangzhou (CN)

( * ) Notice: Subject to any disclaimer, the term of this patent is extended or adjusted under 35 U.S.C. 154(b) by 414 days.

(21) Appl. No.: 17/418,770

(22) PCT Filed: Dec. 13, 2019

(86) PCT No.: PCT/CN2019/125055
§ 371 (c)(1),
(2) Date: Jun. 25, 2021

(87) PCT Pub. No.: WO2020/135095
PCT Pub. Date: Jul. 2, 2020

(65) Prior Publication Data
US 2022/0058250 A1 Feb. 24, 2022

(30) Foreign Application Priority Data

Dec. 26, 2018 (CN) .......................... 201811609118.9

(51) Int. Cl.
G06Q 20/40 (2012.01)
G06F 21/32 (2013.01)
H04L 9/40 (2022.01)

(52) U.S. Cl.
CPC ....... *G06F 21/32* (2013.01); *G06Q 20/40145* (2013.01)

(58) Field of Classification Search
CPC G06F 21/32; G06Q 20/40145; G06Q 20/401; H04L 63/0853; H04L 63/0861; H04L 63/107
See application file for complete search history.

(56) References Cited

U.S. PATENT DOCUMENTS 6,011,858 A * 1/2000 Stock ............... G06Q 20/40145
705/18
9,471,921 B1 10/2016 Dalit et al.
(Continued)

FOREIGN PATENT DOCUMENTS

CN 104463589 A 3/2015
CN 104599126 A 5/2015
(Continued)

OTHER PUBLICATIONS

International Search Report and Written Opinion in corresponding International Application No. PCT/CN2019/125055 dated Mar. 12, 2020.

*Primary Examiner* — Vu V Tran
(74) *Attorney, Agent, or Firm* — Steven Koehler; Westman, Champlin & Koehler, P.A.

(57) ABSTRACT

This application provides an identity Identification method for a fixed-point authorization, and devices and servers therefor, comprises receiving an identification request sent by a service terminal; wherein the identification request comprises terminal information and live body biological characteristic information of a target object; the terminal information comprises a terminal merchant number and terminal location information; determining at least one valid user of the service terminal according to the terminal information, and obtaining biological characteristic information (Continued)

of each valid user; wherein the valid user has a direct or an indirect authorization relationship with the service terminal; completing the identity identification according to the live body biological characteristic information of the target object and the biological characteristic information of each valid user. This application may further simplify the process of identity identification, thereby improving the efficiency of identity identification; in addition, it may also effectively improve the security of identity identification.

11 Claims, 5 Drawing Sheets

(56) References Cited

U.S. PATENT DOCUMENTS

| | | | |
|---|---|---|---|
| 10,375,082 | B2 | 8/2019 | Brown et al. |
| 10,885,525 | B1* | 1/2021 | Sharafi ............... G06Q 20/3674 |
| 11,004,074 | B1* | 5/2021 | Hiccox ............... G06K 19/073 |
| 2007/0260886 | A1* | 11/2007 | Dufour ............... G06V 40/10 |
| | | | 713/186 |
| 2017/0195339 | A1 | 7/2017 | Brown et al. |
| 2017/0262719 | A1 | 9/2017 | Yamazaki et al. |
| 2018/0004927 | A1 | 1/2018 | Lowe |
| 2019/0319965 | A1 | 10/2019 | Brown et al. |
| 2021/0117524 | A1* | 4/2021 | Mckell-Redwood ........................ |
| | | | H04L 9/3231 |
| 2021/0184857 | A1* | 6/2021 | Chen ............... H04L 63/0861 |

FOREIGN PATENT DOCUMENTS

| | | |
|---|---|---|
| CN | 104639498 A | 5/2015 |
| CN | 105847253 A | 8/2016 |
| CN | 106953873 A | 7/2017 |
| CN | 107369017 A | 7/2017 |
| CN | 107018138 A | 8/2017 |
| CN | 107077549 A | 8/2017 |
| CN | 107734158 A | 2/2018 |
| CN | 108171512 A | 6/2018 |
| CN | 108369620 A | 8/2018 |
| CN | 109684811 A | 4/2019 |
| KR | 20150051973 A | 5/2015 |

* cited by examiner

FIXED-POINT AUTHORIZATION IDENTITY RECOGNITION METHOD AND APPARATUS, AND SERVER

CROSS-REFERENCES TO RELATED APPLICATIONS

This application claims priority of Chinese Patent Application No. CN201811609118.9, titled "Identity identification Methods for A Fixed-Point Authorization, and Devices and Servers Therefor", filed with the Chinese Patent Office on 26 Dec. 2018, the entire content of which is incorporated by reference in this application.

TECHNICAL FIELD

This application relates to the field of Internet technology, and in particular to an identity Identification method for a fixed-point authorization, and devices and servers therefor.

TECHNICAL BACKGROUND

With continuous developments of network technology and automated equipment technology, identity identification technology has also developed, and identity identification technology has been applied to many services such as mobile payment and identity authentication etc. Currently, users need to provide a two-dimensional code or provide physical identity documents and other information through their mobile phones when performing identity identification, resulting in a cumbersome identity identification process. Especially when the mobile phone or identity documents are lost, there may be problems such as fraudulent use of user identity by illegal personnel etc., and the security of identity identification is low.

SUMMARY OF THE INVENTION

In view of this, the purpose of this application is to provide an identity Identification method for a fixed-point authorization, and devices and servers therefor, which may further simplify the process of identity identification, thereby improving the efficiency of identity identification. In addition, it may also effectively improve the security of identity identification.

In a first aspect, the embodiments of this application provide an identity identification method for a fixed-point authorization, the method comprises: receiving an identification request sent by a service terminal; wherein the identification request comprises terminal information and live body biological characteristic information of a target object; the terminal information comprises a terminal merchant number and terminal location information; determining at least one valid user of the service terminal according to the terminal information, and obtaining biological characteristic information of each valid user; wherein the valid user has a direct or an indirect authorization relationship with the service terminal; completing the identity identification according to the live body biological characteristic information of the target object and the biological characteristic information of each valid user.

In combination with the first aspect, the embodiments of the present application provide a first possible implementation method of the first aspect, wherein the above step of determining at least one valid user of the service terminal according to the terminal information comprises: obtaining a belonging relationship table; wherein the belonging relationship table stores corresponding relationships between terminal merchant numbers and authorization point number information; searching the authorization point number information corresponding to the terminal merchant number in the belonging relationship table; obtaining an authorization relationship table; wherein the authorization relationship table stores corresponding relationships between authorization point number information and user accounts; searching for at least one user account corresponding to the authorization point number information in the authorization relationship table; determining a user corresponding to the user account as the valid user of the service terminal.

In combination with the first aspect, the embodiments of the present application provide a second possible implementation method of the first aspect, wherein the above step of completing the identity identification according to the live body biological characteristic information of the target object and the biological characteristic information of each valid user comprises: determining whether the live body biological characteristic information of the target object is directly derived from a real live body; if yes, determining whether a biological characteristic matching is successfully matched; when the biological characteristic matching is successfully matched, sending a location request to an associated terminal of each valid user successfully matched; receiving valid user location information sent by the associated terminal of each valid user successfully matched based on the location request; completing the identity identification according to the terminal location information and each valid user location information successfully matched.

In combination with the second possible implementation method of the first aspect, the embodiments of the present application provide a third possible implementation method of the first aspect, wherein the above step of completing the identity identification according to the terminal location information and the valid user location information comprises: determining a valid area of the service terminal according to the terminal location information; determining whether each valid user location information successfully matched is within the valid area of the service terminal; if not, sending a first identity confirmation request to the service terminal, so that the service terminal returns first identity information based on the first identity confirmation request; receiving the first identity information returned by the service terminal, and completing the identity identification based on the first identity information; if yes, determining whether the valid user successfully matched in the valid area is unique; when the valid user successfully matched in the valid area is unique, determining the valid user successfully matched as the target object, and completing the identity identification; when the valid user successfully matched in the valid area is not unique, sending a second identity confirmation request to the associated terminal of each valid user successfully matched; determining whether at least one of second identity information sent by the associated terminal of each valid user successfully matched for the second identity confirmation request is received; if yes, completing identity identification according to the second identity information; if not, sending a third identity confirmation request to the service terminal, so that the service terminal returns third identity information based on the third identity confirmation request; receiving the third identity information returned by the service terminal, and completing identity identification based on the third identity information.

In combination with the first aspect, the embodiments of the present application provide a fourth possible implementation method of the first aspect, wherein the above method further comprises: after the identity identification is completed, sending an identity identification result and a service request to a payment system, so that the payment system finds a payment account corresponding to the identity identification result, and completing a payment operation based on the payment account and the service request; generating an invoice service request according to the payment operation, and sending the invoice service request to an invoice system, so that the invoice system generates an electronic payment invoice according to the invoice service request, and sending the electronic payment invoice to an email address designated by the target object, and/or to the service terminal.

In combination with the first aspect, the embodiments of the present application provide a fifth possible implementation method of the first aspect, wherein the above method further comprises: when the identity identification is completed, sending an identity identification result and a service request to an identity authentication system, so that the identity authentication system converts the identity identification result into personal identity information, and completing an identity authentication based on the personal identity information and the service request.

In combination with the first aspect, the embodiments of the present application provide a sixth possible implementation method of the first aspect, wherein the above method further comprises: receiving a registration instruction sent by an associated terminal of the target object; wherein the registration instruction carries a user account of the target object; sending prompt information to the associated terminal of the target object to prompt the target object to upload identity information; wherein the identity information comprises the biological characteristic information of the user; receiving the identity information uploaded by the target object, and verifying whether the identity information is legal; if yes, associating and saving in a preset area the biological characteristic information of the target object and the user account of the target object.

In combination with the third possible implementation method of the first aspect, the embodiments of the present application provide a seventh possible implementation method of the first aspect, wherein the above method further comprises: generating an identity identification log, and sending the identity identification log to the associated terminal of the target object to prompt the completion of the identity identification of the target object.

In combination with the first aspect, the embodiments of the present application provide an eighth possible implementation method of the first aspect, wherein the above method further comprises: when the biological characteristic information is a human face biological characteristic, human face biological characteristic information comprises live body human face biological characteristic information of the target object or the live body human face biological characteristic information combined with facial expression information of the target object.

In a second aspect, the embodiments of this application further provide an identity identification device for a fixed-point authorization, the device comprises: a receiving module configured to receive an identification request sent by a service terminal; wherein the identification request comprises terminal information and live body biological characteristic information of a target object; the terminal information comprises a terminal merchant number and terminal location information; an information acquisition module configured to determine at least one valid user of the service terminal according to the terminal information, and obtaining biological characteristic information of each valid user; wherein the valid user has a direct or an indirect authorization relationship with the service terminal; an identification module configured to complete the identity identification according to the live body biological characteristic information of the target object and the biological characteristic information of each valid user.

In a third aspect, the embodiments of this application further provide a server, comprising a processor and a memory; a computer program is stored on the memory, and the computer program executes a method such as the method of any one of the first aspect to the eighth possible implementation method of the first aspect.

In a fourth aspect, the embodiments of this application further provide a computer storage medium, configured to store computer software instructions used in the method of any one of the first aspect to the eighth possible implementation method of the first aspect.

The embodiments of the application bring the following beneficial effects:

The embodiment of the application provides an identity Identification method for a fixed-point authorization, and devices and servers therefor. Firstly, receiving an identification request sent by a service terminal, then determining at least one valid user of the service terminal according to the terminal information, and obtaining biological characteristic information of each valid user; wherein the valid user has a direct or an indirect authorization relationship with the service terminal; completing the identity identification according to the live body biological characteristic information of the target object and the biological characteristic information of each valid user. The embodiment of this application may further simplify the process of identity identification through a direct or indirect authorization relationship between the user and the service terminal, thereby improving the efficiency of identity identification. In addition, identifying the user's identity through the live body biological characteristic information may also effectively improve the security of identity identification.

Other features and advantages of the present application will be described in the following description, and partly become obvious from the description or understood by implementing the present application. The purpose and other advantages of the application are realized and obtained by the structures specifically pointed out in the description, claims and figures.

In order to make the above-mentioned objectives, features and advantages of the present application more obvious and understandable, the preferred embodiments and accompanying figures are described in detail as follows.

DESCRIPTION OF THE FIGURES

In order to more clearly illustrate the specific embodiments of the application or the technical solutions in the prior art, the following will briefly introduce the figures that need to be used in the description of the specific embodiments or the prior art. Obviously, the figures in the following description are some embodiments of the present application. For those of ordinary skill in the art, other figures may be obtained based on these figures without any inventive work.

DESCRIPTION

In order to make the purpose, technical solutions and advantages of the embodiments of this application clearer, the technical solutions of this application will be described clearly and completely in conjunction with the accompanying figures. Obviously, the described embodiments are part of the embodiments of this application, not all of the embodiments. Based on the embodiments in this application, all other embodiments obtained by those of ordinary skill in the art without inventive work shall fall within the protection scope of this application.

Currently, users need to provide a two-dimensional code or provide physical identity documents and other information through their mobile phones when performing identity identification, resulting in a cumbersome identity identification process. Especially when the mobile phone or identity documents are lost, there may be problems such as fraudulent use of user identity by illegal personnel etc., and the security of identity identification is low. Based on this, identity identification methods for a fixed-point authorization and devices and servers therefor in the embodiments of the present application may further simplify the process of identity identification, thereby improving the efficiency of identity identification. In addition, it may also effectively improve the security of identity identification.

Figure 1:
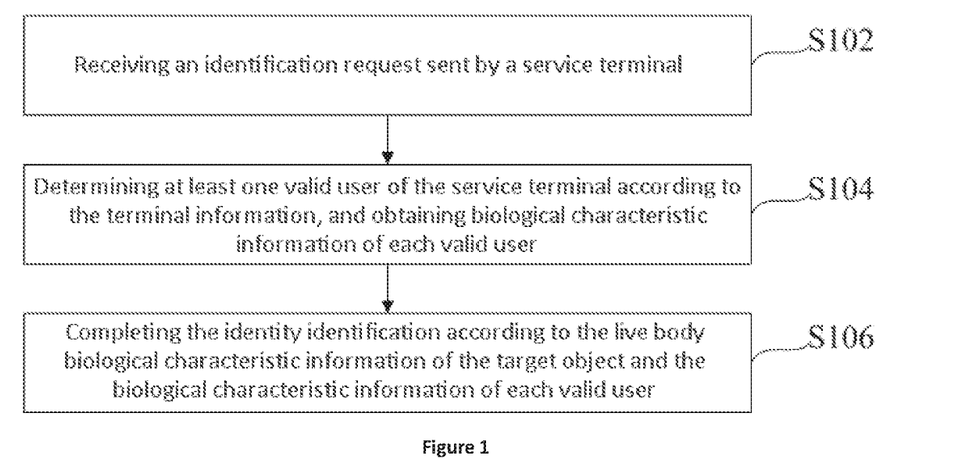
FIG. 1 is a flowchart of an identity Identification method for a fixed-point authorization provided by an embodiment of the application.

In order to facilitate the understanding of this embodiment, firstly, a detailed description of an identity Identification method for a fixed-point authorization disclosed in an embodiment of the application is given. Referring to the flowchart of the identity Identification method for a fixed-point authorization shown in FIG. 1, the method comprises the following step:

Step S102: receiving an identification request sent by a service terminal.

Under normal circumstances, when a user performs identity authentication, the service terminal usually initiates the identity identification, and the user's cooperation is required to complete the identity identification. Specifically, the user cooperates with the service terminal to collect the live body biological characteristics of the user so that the merchant system may collect the live body biological characteristic information of the user, and generate an identification request based on the terminal information and the biological characteristic information of the target object. The terminal information comprises the terminal merchant number and the terminal location information.

Specifically, mobile payment terminals, including payment devices such as cash registers, POS (point of sale) machines, smart scanners, handheld devices, tablet computers, smart TVs, mobile phones, smart robots, claw machines, game machines, automatic payment machines, self-service recharge machines and smart face payment devices etc. may be used to generate service requests. In another embodiment, identity authentication terminals, including identity authentication equipment such as self-service terminals (e-government self-service terminals, e-banking self-service terminals, electronic tax self-service terminals, hotel check-in terminals, ATM (Automatic Teller Machine) machines, queuing machines, number machines, self-checking machines, self-service invoice machines, self-service ticket machines and self-service settlement machines, etc.), shared equipment, smart robots, smart cars, drones, identity authentication machines, member and VIP identification devices, smart access control, smart video intercom devices and smart gates etc. may further be used to generate service requests.

In addition, terminal location information may be set manually, one or more positioning technologies such as BDS (BeiDou Navigation Satellite System), GPS (Global Positioning System), LBS (Location Based Service), AGPS (Assisted Global Positioning System), GSM (Global System for Mobile communications), IP (Internet Protocol) address positioning, WIFI (Wireless Fidelity) and gyroscope positioning etc. for locating the location of the service terminal to obtain the first location information of the service terminal. Further, the comprehensive use of the above methods may obtain more accurate first location information where the service terminal is located.

In addition to mobile phones, associated terminal devices of users may also be personal mobile devices such as laptops, tablets, smart watches, smart bracelets, smart glasses, smart earplugs, and smart button-type devices etc.

Further, the biological characteristic information may be one or more of biological characteristic such as face, iris, sclera, eye prints, palm veins, palm prints, ear prints, finger veins, and voice prints etc. The user's biological characteristic information is collected by installing corresponding biometric collection structures and pre-stored biological characteristic collection method on the service terminal. Further, the user's biological characteristic information is collected by installing a corresponding live body biological characteristic collection structure and a pre-stored live body biological characteristic collection method on the service terminal, and the collected biological characteristic information is the live body biological characteristic information. Preferably, the human face identification technology can be selected to obtain the user's identity characteristic information. The current human face identification technology has been developed to an error rate of one in ten million, so the accuracy of identity identification may be improved through the human face identification technology. In order to prevent users from their identities being stolen and scanned in unconscious situations such as normal, sleeping, coma, drunkenness, or even death, resulting in the loss of funds, human face identification technology and facial gesture identification technology may also be combined. The object to be authenticated may customize the expression required for identification based on their own preferences to prevent stolen funds; further, taking into account that there will be two people who look exactly the same when they are brothers, sisters, twins, or not related by blood, that is, human faces are not unique, despite the similar appearances, because the expressions are not the same, it may further prevent the identity of similar-looking users such as twins from being confused.

Step S104: determining at least one valid user of the service terminal according to the terminal information, and obtaining biological characteristic information of each valid user.

Among them, there is a direct or indirect authorization relationship between the valid user and the service terminal. Take Beijing West High-speed Railway Station as an example. Beijing West Railway Station has multiple self-service terminal machines (that is, the aforementioned service terminals), and each self-service terminal corresponds to an authorization point, but the user does not authorize a certain machine when authorizing. Instead, the Beijing West Railway Station is authorized. Therefore, the entire Beijing West Railway Station should be regarded as an authorization point, that is, the user has an indirect authorization relationship with each self-service terminal of Beijing West Railway Station, and a direct authorization relationship with Beijing West Railway Station.

As the terminal merchant number is included in the service request, and the corresponding relationship between the terminal merchant number and the authorization point number information is stored in the belonging relationship table, the corresponding authorization point number may be queried through the terminal merchant number, that is, the authorization point number of Beijing West Railway Station is queried through the terminal merchant number of one of the self-service terminal machines in Beijing West Railway Station; the authorization relationship table stores the corresponding relationship between the authorization point number information and the user account, and the authorization relationship table may be used to find all user accounts associated with the authorization point number information, that is, through the authorization relationship table, all user accounts associated with the Beijing West Railway Station authorization point number information may be found; therefore, the valid users corresponding to the terminal merchant numbers may be found, and the biological characteristic information corresponding to each valid user may be obtained. Among them, a valid user refers to a user of the service terminal. It is understandable that when searching for biological characteristic information, only valid users corresponding to the terminal merchant number need to be obtained, so the amount of searches when searching for biological characteristic information is effectively reduced.

Step S106: completing the identity identification according to the live body biological characteristic information of the target object and the biological characteristic information of each valid user.

Specifically, it should first be determined whether the biological characteristic information of the target object is directly derived from the real live body. It is understandable that when the biological characteristic information of the target object is not directly derived from the real live body, there is someone else using the user's photo or other non-live information for identification, and fraudulently using the user's identity information, so it should first determine whether the target object's live body biological characteristic information is directly derived from the real live body. When the biological characteristic information of the target object is directly derived from the real live body, compare the biological characteristic information of the target object with the biological characteristic information of each user. When the comparison similarity threshold is higher than the preset threshold, it is determined that that user is the target object, and the identity information corresponding to the user may be searched in the system.

Further, when the collected biological characteristic information of the target object is human face information, the user corresponding to the target object may be found in the system by comparing the human face information of the target object and the aforementioned users, and the identity information of the target object may be determined. Further, when human face identification technology and facial gesture identification technology are combined, the biological characteristic information of the target object should include human face information and expression information, and the identity information of the target object may be determined only when the human face information and expression information are matched successfully. It may prevent the risk of fraudulent use of identity under the will of the person, and further prevent the identity confusion of similar-looking users such as twins.

The embodiment of the application provides an identity Identification method for a fixed-point authorization. Firstly, receiving an identification request sent by a service terminal, then determining at least one valid user of the service terminal according to the terminal information, and obtaining biological characteristic information of each valid user; wherein the valid user has a direct or an indirect authorization relationship with the service terminal; completing the identity identification according to the live body biological characteristic information of the target object and the biological characteristic information of each valid user. The embodiment of this application may further simplify the process of identity identification through a direct or indirect authorization relationship between the user and the service terminal, thereby improving the efficiency of identity identification. In addition, identifying the user's identity through the live body biological characteristic information may also effectively improve the security of identity identification.

Figure 2:
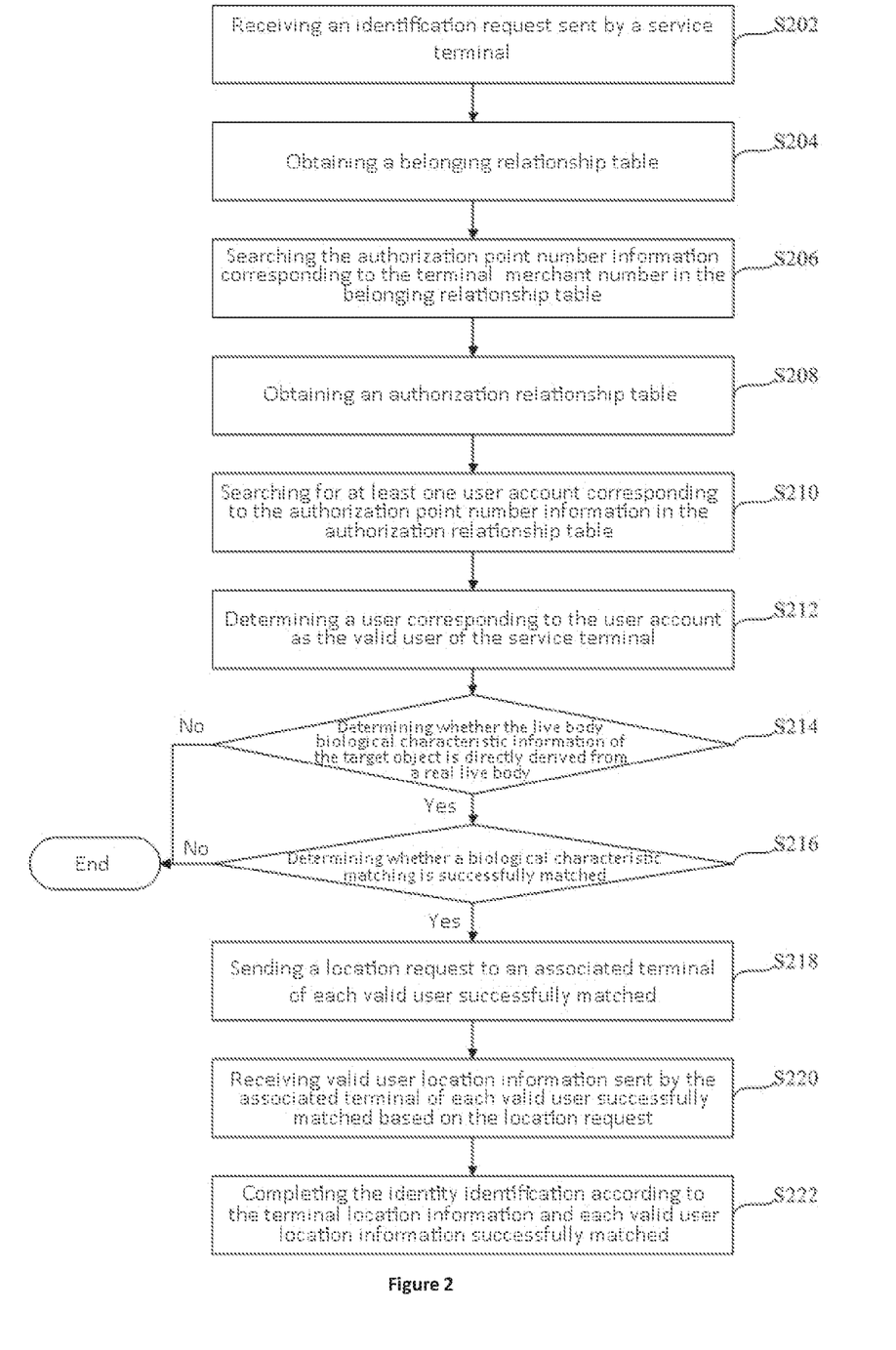
FIG. 2 is a flowchart of another identity Identification method for a fixed-point authorization according to an embodiment of the application.

In order to facilitate the understanding of the above-mentioned embodiment, the embodiment of the present application also provides another identity identification method for a fixed-point authorization. Referring to the flowchart of another identity Identification method for a fixed-point authorization shown in FIG. 2, the method comprises the following steps:

Step S202: receiving an identification request sent by a service terminal.

Step S204: obtaining a belonging relationship table.

The corresponding relationship between the terminal merchant number and the authorization point number information is stored in the belonging relationship table. The authorization point number information corresponding to the terminal merchant number is searched in the relationship table, to find the corresponding authorization server.

Step S206: searching the authorization point number information corresponding to the terminal merchant number in the belonging relationship table.

Step S208: obtaining an authorization relationship table.

Among them, the authorization relationship table stores the corresponding relationship between the authorization point number information and the user account. When the user authorizes the authorization point, the corresponding relationship between the authorization point number information and the valid user is stored in the table to obtain the authorization relationship table. Through the authorization relationship table, there is no need to search for the user's biological characteristic information in a large area, and only the biological characteristic information of the valid user authorized by the authorization server corresponding to the authorization point number information is acquired. In addition, because the amount of acquired biological characteristic information of valid users is limited, the time required for human face matching may be further reduced.

Step S210: searching for at least one user account corresponding to the authorization point number information in the authorization relationship table.

Normally, when the target object uses the method provided in the embodiment of this application, the authorization server needs to be authorized. Therefore, in the authorization relationship table, there is at least the corresponding relationship between the target object and the authorization server, so at least one valid user may be obtained. If the target object does not authorize the authorization server, the identification cannot be completed. For example, if user A, user B, and user C are stored in the authorization relationship table, all corresponding to the authorization point number information, then valid user A, valid user B, and valid user C are all valid users of the merchant system.

Step S212: determining a user corresponding to the user account as the valid user of the service terminal.

When there are multiple users who authorize the authorization server, that is, there are multiple valid users corresponding to the authorization point number information, each valid user is regarded as a valid user of the authorization server.

Step S214: determining whether the live body biological characteristic information of the target object is directly derived from a real live body. If yes, go to step S216; if no, end.

In order to prevent others from impersonating their identity through photos or videos, firstly, determine whether the identity information of the target object is directly derived from a real live body. If not, the identity identification is directly ended, and the identification failure information is returned to the service terminal, if it is, the process after determining whether the live body biological characteristic information of the target object is directly derived from a real live body is performed.

Step S216: determining whether a biological characteristic matching is successfully matched. If yes, go to step S218; if no, end.

In an embodiment, the similarity value may be calculated based on the biological characteristic information of each valid user and the biological characteristic information of the target object. For example, matching the biological characteristic information of the valid user A, valid user B, and valid user C with the biological characteristic information of the target object D, and calculate the similarity value of the valid user A, valid user B, and valid user C to the target object D. The similarity value between the valid user A and the target object D is 70%, the similarity value between the valid user B and the target object D is 80%, and the similarity value between the valid user C and the target object D is 95%.

A similarity threshold is preset, and when the similarity value is greater than the similarity threshold, the matching may be successful. Assuming that the preset similarity threshold is 90%, as the similarity value of the valid user C and the target object D is greater than the preset similarity threshold, and the similarity values of the valid user A and the valid user B and the target object D are all less than the similarity threshold, the valid user C is determined to be the target object D. Further, in order to ensure the accuracy of the identification result, the next step of matching may be performed.

Step S218: sending a location request to an associated terminal of each valid user successfully matched.

Considering that there may be multiple valid users whose similarity values with the target object are greater than the preset similarity threshold. Therefore, when there are multiple valid users with a similarity value greater than the preset similarity threshold, a location request is sent to the associated terminal of each valid user whose similarity value is greater than the preset similarity threshold, and the valid user location information sent by the associated terminal of each valid user based on the location request is received, then the valid payment area of the merchant system is divided according to the merchant location information, and it is determined whether the valid user location information is within the valid payment area of the merchant system. When there is a valid user in the valid payment area, it is determined as the target user.

In another implementation method, a confirmation request may be sent to the associated terminal of each valid user whose similarity value is greater than a preset similarity threshold. So that the target object returns a confirmation instruction based on the payment request. When receiving the confirmation instruction sent by the associated terminal of the valid user for the confirmation request, the valid user corresponding to the associated terminal sending the confirmation instruction is determined as the target user.

Step S220: receiving valid user location information sent by the associated terminal of each valid user successfully matched based on the location request.

Step S222: completing the identity identification according to the terminal location information and each valid user location information successfully matched.

Further, the embodiment of the present application also provides a method for completing identity identification based on terminal location information and valid user location information. Refer to the following steps:

(1) determining a valid area of the service terminal according to the terminal location information.

(2) determining whether each valid user location information successfully matched is within the valid area of the service terminal. In order to prevent others from fraudulently using the user's identity information for identity identification remotely, the service terminal may be divided into valid areas, and the user may be identified only when the user is in the valid area of the service terminal, (3) if not, sending a first identity confirmation request to the service terminal, so that the service terminal returns first identity information based on the first identity confirmation request. It may be understood as the user's associated terminal is not in the valid range, that is, the user has forgotten to bring the mobile phone or the mobile phone is turned off, so the identity confirmation request is sent to the service terminal, and the user is required to enter the mobile phone number or collect biological characteristics and other information as the first identity information. This method may effectively solve the situation of forgetting to bring the mobile phone or the mobile phone is out of power; and may realize payment without mobile phone.

(4) if yes, determining whether the valid user successfully matched in the valid area is unique. It may be understood that the biological characteristic information of multiple users may be similar to that of the target object. Therefore, it is further determined whether multiple users are matched.

(5) when the valid user successfully matched in the valid area is unique, determining the valid user successfully matched as the target object, and completing the identity identification. If only one user is matched with similar biological characteristic information of the target object, the user may be confirmed as the target object and the identity identification may be completed.

(6) when the valid user successfully matched in the valid area is not unique, sending a second identity confirmation request to the associated terminal of each valid user successfully matched. When the biological characteristic information of multiple users and the target object is similar, further identity identification is required. Specifically, the second identity confirmation request may be sent to the associated terminal of each user successfully matched, so that each user returns the second identity information based on the second identity confirmation request. Among them, the second identity information may be the identification number or the last few digits of the identification number of the target object.

(7) determining whether at least one of second identity information sent by the associated terminal of each valid user successfully matched for the second identity confirmation request is received. Considering that the associated terminal of the target object is out of power or is not carried around, when the second identity confirmation request is sent to the associated terminal of each successfully matched valid user, the target object may not be able to return the second identity information for the second identity confirmation request, so it is determined whether the second identity information is received. Among them, for young children, elderly people, or people who are not suitable for carrying mobile phones for physical reasons, they may use the same mobile phone to perform positioning, and then let them perform face scan verification. Based on this, the associated terminal may send at least one second Identity Information.

(8) When receiving the second identity information, completing identity identification according to the second identity information. Specifically, when receiving the identity confirmation information sent by the associated terminal of each user successfully matched for the identity confirmation request, the identity confirmation information sent by the associated terminal of each user is determined, and the determination result is obtained. Among them, the determination result may be that the information is wrong or the information is correct. When the determination result is that the information is wrong, it means that the identity confirmation information returned by the associated terminal does not match the identity information of the target object; when the determination result is that the information is correct, the user of the associated terminal may be confirmed as the target object, then the identity identification is completed.

(9) sending a third identity confirmation request to the service terminal, so that the service terminal returns third identity information based on the third identity confirmation request. Among them, the second identity request may be a request to send the associated terminal account or mobile phone number of the target object. In this case, the user's associated terminal is within the valid range, but the second identity information reply is not made in time. It is most likely that the user forgot to carry the mobile phone, so the third identity confirmation request is sent to the service terminal.

(10) receiving the third identity information returned by the service terminal, and completing identity identification based on the third identity information. According to the associated terminal account or mobile phone number provided by the target object, identity identification is also completed, so that identity identification may be completed without carrying a mobile phone.

The embodiment of the application provides an identity Identification method for a fixed-point authorization. Firstly, receiving an identification request sent by a service terminal, then determining at least one valid user of the service terminal according to the terminal information, and obtaining biological characteristic information of each valid user; wherein the valid user has a direct or an indirect authorization relationship with the service terminal; completing the identity identification according to the live body biological characteristic information of the target object and the biological characteristic information of each valid user. The embodiment of this application may further simplify the process of identity identification through a direct or indirect authorization relationship between the user and the service terminal, thereby improving the efficiency of identity identification. In addition, identifying the user's identity through the live body biological characteristic information may also effectively improve the security of identity identification.

Further, the embodiment of the present application also provides a method for a user to register to the system, referring to the following steps:

(1) receiving a registration instruction sent by an associated terminal of the target object.

Among them, the registration instruction carries a user account of the target object. Generally, the user needs to download the corresponding software, install and open the software, and then enter the user name, password and mobile phone number in the registration interface, click the registration button, and send the registration instruction to the execution body of the embodiment of this application.

(2) sending prompt information to the associated terminal of the target object to prompt the target object to upload identity information.

Among them, the identity information comprises the biological characteristic information of the user. Specifically, the biological characteristic information may be information such as a static image, an image taken on site, and an image of a human face taken on site. In addition, in order to prevent criminals from impersonating the biological characteristic information of other users, it is also necessary to upload information such as the user's name or identification number.

(3) receiving the identity information uploaded by the target object, and verifying whether the identity information is legal.

Specifically, the above-mentioned identity information may be passed into the relevant identity authentication system to verify whether the user's identity information and the biological characteristic information match. When it is determined that the identity information and the biological characteristic information match, it may be determined that the user's identity information is legal.

(4) if yes, associating and saving in a preset area the biological characteristic information of the target object and the user account of the target object.

In order to prevent the leakage of the user's identity information, only the user account and biological characteristic information are saved, and the user's personal identity information is not saved.

Further, an identification log is generated, and the identification log is sent to the associated terminal of the target object to prompt the completion of the identification of the target object.

Further, when the biological characteristic information is a human face biological characteristics, the human face biological characteristic information includes the live body human face biological characteristic information of the target object or the live body human face biological characteristic information combined with the facial expression information of the target object, that is, the live body human face characteristic information may also include the facial expression information of the target object, and when collecting the facial expression information of the user, the user needs to cooperate to make the corresponding expression. For example, when the identity is used for payment, the user needs to make a payment expression; when the identity is used for identity authentication, the user needs to make a corresponding expression.

Figure 3:
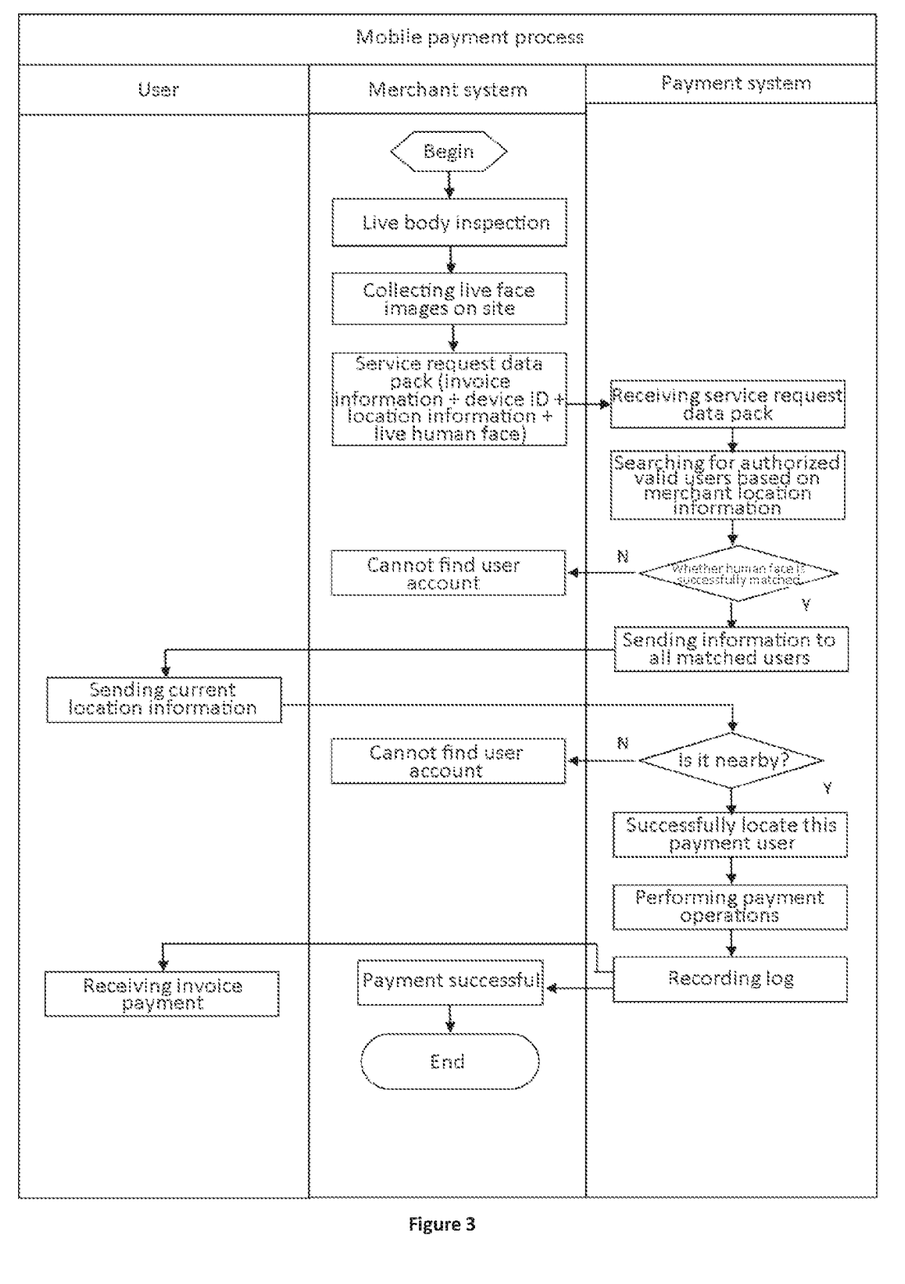
FIG. 3 is an illustrative flow chart of another identity Identification method for a fixed-point authorization according to an embodiment of the application.

In order to facilitate the understanding of the above-mentioned embodiment, the embodiment of this application also provides another identity identification method for a fixed-point authorization. Taking fixed-point authorization for payment based on identity identification as an example, referring to another flowchart of an identity identification method for a fixed-point authorization shown in FIG. 3, the method comprise the following steps:

After the identity identification is completed, the identity identification result and service request are sent to the payment system so that the payment system finds the payment account corresponding to the identity identification result, and the payment operation is completed based on the payment account and service request, and then a payment invoice is generated according to the payment operation, and the payment invoice is sent to the associated terminal of the target user.

Specifically, the merchant's payment terminal first performs a live body detection of the user, and then collects the user's live body human face image, and according to the user's billing information, merchant device ID (Identity, identification number), merchant location information and live body human face to generate a service request data pack, and send the service request data pack to the system. After receiving the service request data pack, the system searches for nearby valid users based on the merchant location information in the service request data pack, and the system sends the live body human face in the service request data pack for matching with the human face in the system. When the matching is unsuccessful, the merchant's payment terminal will return "User Account Not Found" and the payment will be terminated; when the matching is successful, the information will be sent to all users successfully matched to allow the user to return the location information of the user based on the information, and determine whether the location information of the user is close to the location information of the merchant, if not, "User Account Not Found" is returned to the payment terminal; if yes, this payment user is located successfully, and then the payment operation is performed according to this payment user, the log is recorded, and then "Payment Successful" is sent to the merchant's payment terminal, and send a "Payment Invoice" to the user's associated terminal.

Preferably, when the location information of the user is not close to the location information of the merchant, an identity confirmation request may be sent to the service terminal, and the user provides identity confirmation information such as a mobile phone number to complete the payment operation.

Further, human face identification technology and facial gesture identification technology may be combined to reduce the risk of funds being stolen by others without precaution, and at the same time, it may effectively distinguish two or more similar users.

Further, the user may also set an alarm expression. When the user is threatened to transfer assets, the alarm expression may be used when collecting human face information, and the system may implement an alarm operation based on the alarm expression, thereby improving the user's personal safety and property safety.

Figure 4:
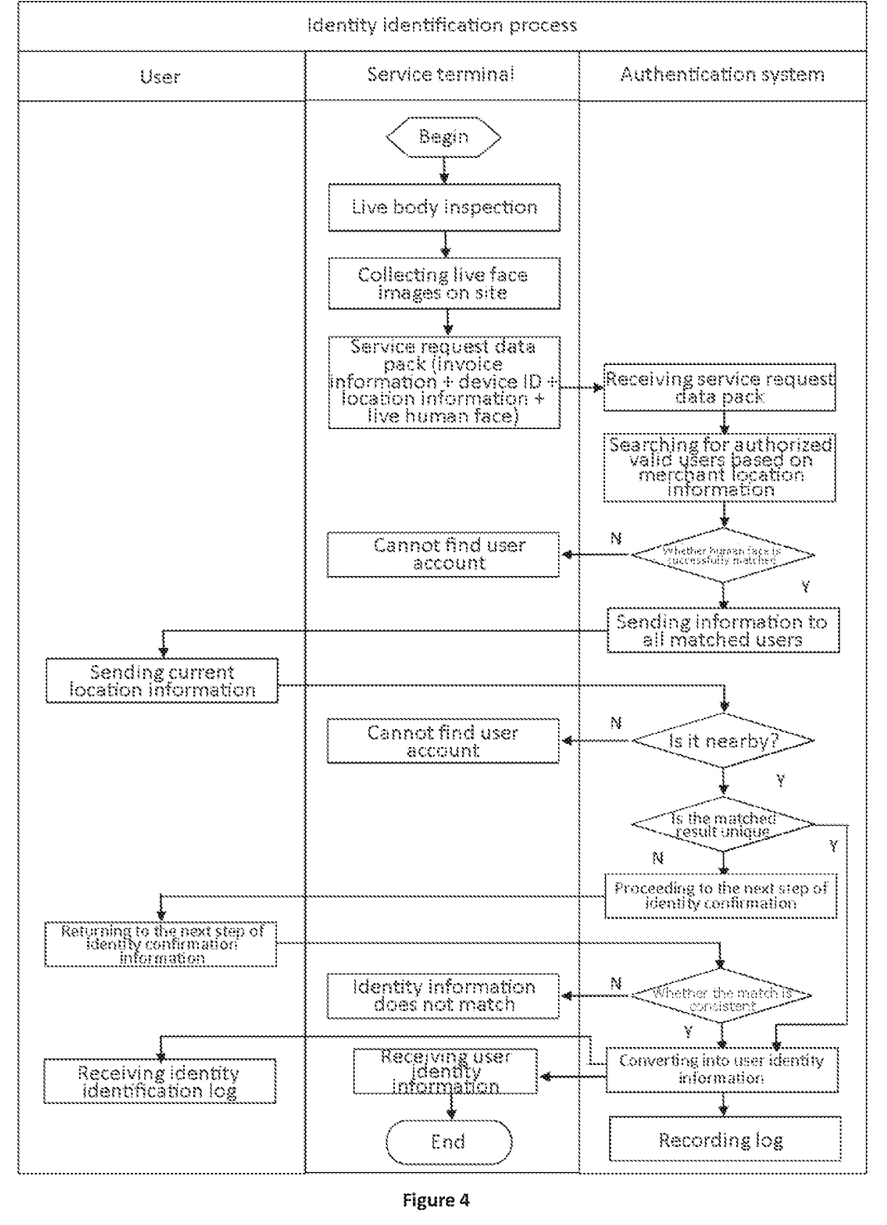
FIG. 4 is a flowchart of another identity Identification method for a fixed-point authorization according to an embodiment of the application.

In addition, the method provided in the embodiments of the present application may also be applied to identity authentication. Referring to FIG. 4 for another flow chart of identity identification for fixed-point authorization, the method comprises the following steps:

After the identity identification is completed, the identity identification result and the service request are sent to the authentication system, so that the authentication system converts the identity identification result into identity information, and completes the identity authentication according to the identity information and the service request.

Specifically, when a user needs to perform identity authentication, the user's authentication terminal first performs a live body detection of the user, then collects the user's live body human face image, and generates a service request data pack based on the device ID, device type, location information, and live body human face, and sends the service request data pack to the authentication system. After receiving the service request data pack, the authentication system searches for the valid users nearby based on the location information in the service request data pack, and matches the live body human face in the service request pack with the human face in the authentication system. When the matching is unsuccessful, it will return "User Account Not Found" to the authentication terminal and end the authentication; when the matching is successful, it will send information to all users successfully matched, so to allow the user to return the location information of the user based on the information, and to determine whether the location information of the user is close to the location information of the authentication terminal, if not, returns "User Account Not Found" to the authentication terminal; if yes, proceed to the next identity confirmation and send to the user identity confirmation information. After receiving the identity information returned by the associated terminal of the user, it performs matches for the identity information of the above-mentioned users. If the matching is unsuccessful, the authentication terminal sends "Identity Information Does Not Match" and ends the identity authentication; after the matching is successful, the identity information sent by the associated terminal of the user is sent to the authentication terminal, so that the authentication terminal completes identity authentication based on the identity information.

In addition, for the above-mentioned live body human face matching successfully, but the user's location information does not respond or is not close to the authentication terminal location information, the method of sending an identity confirmation request to the authentication terminal may be used, and the user provides the mobile phone number and other identity confirmation information to the authentication terminal to complete identity authentication.

For the above authentication method, it also comprises sending the user account to the identity information system to request the personal identity information of the user. After the identity information system receives the instruction, it first determines whether the user has authorized the permission to read personal identity information, and then determines whether the user has complete personally identifiable information. When the authority to read personal identity information has been authorized and there is complete personal identity information, the identity information system sends the personal identity information corresponding to the account to the authentication system. After the authentication system receives the personal identity information of the user, it returns the personal information to the service terminal to complete the identity authentication and identity information reading operation, and then forms an identity authentication record and pushes it to the associated terminal of the user.

In addition, the above identity authentication method may also be applied to an event. Specifically, the event organizer's sign-in machine logs in to the server and reports its location information; the user installs and activates the corresponding software on the mobile phone, and authorizes the event organizer to allow human face sign-in; when the user needs to sign in by scanning his face, the user scans his face through the sign-in terminal, and sends the sign-in terminal information and human face information to the server of the service provider; based on the event organizer, the server searches for all users who have been authorized to the event organizer, confirmed to participate in the event, returned location information, and user who have not signed in yet. If matching user information is found; then the information is sent to the associated terminal of the user and its current location information is requested to be returned. After receiving the location information, the server determines that the user is within the valid range of the event location. If it is not nearby, it may send the first identity confirmation information to the sign-in terminal, and the user provides the first identity confirmation information to complete the sign-in. If it is nearby, the user is the user who checked in this time. Preferably, when the user is close to the event location, it may be further determined whether the user successfully matched is unique, and if so, the user's sign-in operation may be directly completed. When the matched user is not unique, a second identity request is sent to the associated terminal of each successfully matched user. If at least one second identity information sent by the associated terminal is received, the sign-in operation may be completed; If the second identity information sent by the associated terminal is not received, a third identity confirmation request may be further sent to the sign-in terminal, and the user provides the third identity confirmation information to complete the sign-in operation.

After the user for this operation is determined, the user's sign-in operation is performed, and the user is marked as signed-in; a sign-in record is formed and pushed to the associated terminal of the user.

In summary, the embodiments of this application may achieve at least one of the following features:
(1) The operation is simple and convenient. When matched to the only valid user in the system, the user does not need to take out the mobile phone, relying only on scanning biological characteristic for identity identification, reducing operation steps, making it simpler, more convenient and faster.
(2) Ensure accuracy. The embodiments of this application rely on the existing high-precision biological characteristic identification technology, and through fixed-point authorization, the amount of biological characteristic data to be retrieved is greatly reduced, which ensures the accuracy of comparison and prevents economic disputes caused by miss-determination.
(3) Improve speed and reduce costs. Due to fixed-point authorization, the amount of biological characteristic data that needs to be retrieved is reduced, the comparison speed is increased, and the millisecond level may be achieved; and the investment in equipment is reduced, the investment cost and maintenance difficulty are reduced,
(4) Realize payment without mobile phones. Through the combination of live body biological characteristics and verification information, the user may still realize the payment and identity authentication function even if the user forgets to bring the mobile phone or the mobile phone is out of power, which greatly facilitates the user's travel,
(5) Prevent fraudulent use of identity remotely. Under the premise that the merchant is authorized, the user's mobile phone must be in the same area as the service terminal, otherwise, payment cannot be made, which may effectively prevent illegals outside the area from fraudulently using user information,
(6) Protect user location privacy. The location information is sent to the server only when the user makes a payment, so as to ensure the privacy and security of the user's location information.
(7) Assist the police in solving cases quickly. In the event of coerced transfer of assets and pursuit of escape, the user may be found in the shortest time through the location information of the service terminal or the user's location information, and the cases may be solved quickly.
(8) Realize a life circle without mobile phones. In an area where the user's mobile phone is located, the user may go to a nearby store to pay for consumption by scanning his face without having to carry the mobile phone,
(9) Prevent fraudulent use of identity. Using live body biotechnology may prevent identity from being counterfeited. Taking human faces as an example, using live face identification technology may prevent others from impersonating users with tricks such as cell phone images, videos, photos, masks, and 3D (3 Dimensions) printing heads etc.
(10) Prevent theft of funds. When the biological identification used is human face identification, facial gesture identification technology may be used together. Unless the user consciously makes the facial expression bound to the payment expression and is collected, the user's mobile payment action cannot be performed, which may effectively prevent users from their identity and funds being stolen while they are in a state of normal state, sleeping, drunk, unconscious, or dead etc.
(11) Effectively prevent the identity confusion of twins. Using facial gesture identification technology, since everyone may customize their payment expressions according to their personal preferences, even though they look similar, the payment expressions are different. Therefore, it is possible to further effectively prevent the identity confusion of similar-looking people such as twins.
(12) Ensure the safety of account funds. When the mobile phone is lost or the mobile phone number is obtained by others, due to the combined use of live body biological identification technology and even live body human face gesture identification technology, payment operations will not be possible unless the person performs on-site operations, thereby better ensuring the security of account funds.

(13) Alarm expression. Using facial gesture identification technology, an alarm expression may be set while setting a valid payment expression. When making a payment, if an alarm expression is displayed, the payment operation will be processed accordingly, and the nearest alarm processing will be performed to prevent the transfer of assets by the threat of criminals.

Figure 5:
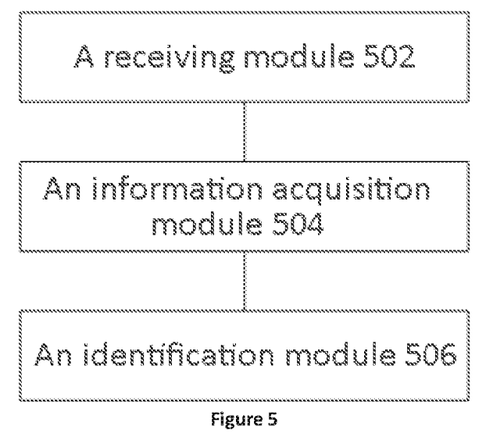
FIG. 5 is an illustrative structural diagram of an identity Identification device for a fixed-point authorization provided by an embodiment of this application.

Regarding an identity identification method for a fixed-point authorization provided in the foregoing embodiments, an embodiment of the present application also provides an identity identification device for fixed-point authorization. Referring to FIG. 5 for an illustrative structural diagram of an identity identification device for fixed-point authorization the device comprises the following parts:

A receiving module 502 configured to receive an identification request sent by a service terminal; wherein the identification request comprises terminal information and live body biological characteristic information of a target object; the terminal information comprises a terminal merchant number and terminal location information.

An information acquisition module 504 configured to determine at least one valid user of the service terminal according to the terminal information, and obtaining biological characteristic information of each valid user; wherein the valid user has a direct or an indirect authorization relationship with the service terminal.

An identification module 506 configured to complete the identity identification according to the live body biological characteristic information of the target object and the biological characteristic information of each valid user.

The embodiment of the application provides an identity Identification device for a fixed-point authorization. Firstly, a receiving module receives an identification request sent by a service terminal, then an information acquisition module determines at least one valid user of the service terminal according to the terminal information, and obtaining biological characteristic information of each valid user; wherein the valid user has a direct or an indirect authorization relationship with the service terminal; an identification module completes the identity identification according to the live body biological characteristic information of the target object and the biological characteristic information of each valid user. The embodiment of this application may further simplify the process of identity identification through a direct or indirect authorization relationship between the user and the service terminal, thereby improving the efficiency of identity identification. In addition, identifying the user's identity through the live body biological characteristic information may also effectively improve the security of identity identification.

The implementation principles and technical effects of the device provided in the embodiments of the application are the same as those of the foregoing method embodiments. For a brief description, for the parts not mentioned in the device embodiments, please refer to the corresponding content in the foregoing method embodiments.

The device is a type of server. Specifically, the server comprises a processor and a storage device; the storage device stores a computer program, and the computer program executes the method described in any one of the above embodiments when the computer program is run by the processor.

Figure 6:
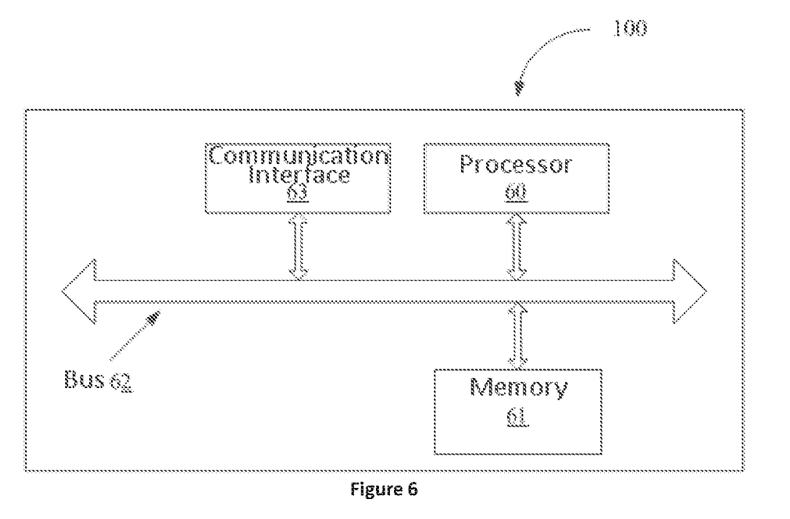
FIG. 6 is an illustrative structural diagram of a server provided by an embodiment of the application.

FIG. 6 is an illustrative structural diagram of a server provided by an embodiment of the application. The server 100 comprises a processor 60, a memory 61, a bus 62 and a communication interface 63, and the processor 60, the communication interface 63 and the memory 61 are connected by the bus 62; The processor 60 is configured to execute an executable module stored in the memory 61, such as a computer program.

Among them, the memory 61 may comprise a high-speed Random Access Memory (RAM), and may also comprise a non-volatile memory, for example, at least one disk memory. The communication connection between the network element of the system and at least one other network element is realized through at least one communication interface 63 (which may be wired or wireless), and the Internet, a wide area network, a local network, a metropolitan area network etc. may be used.

The bus 62 may be an ISA bus, a PCI bus, an EISA bus etc. The bus may be divided into address bus, data bus and control bus. For ease of presentation, only one bidirectional arrow is used in FIG. 6, but it does not mean that there is only one bus or one type of bus.

Among them, the memory 61 is used to store a program, and the processor 60 executes the program after receiving an execution instruction. The method executed by the flow process defined apparatus disclosed in any of the foregoing embodiments of the present application may be applied to the processor 60, or implemented by the processor 60.

The processor 60 may be an integrated circuit chip with signal processing capabilities. In the implementation process, the steps of the foregoing method may be completed by an integrated logic circuit of hardware in the processor 60 or instructions in the form of software. The aforementioned processor 60 may be a general-purpose processor, including a central processing unit (CPU for short), a network processor (NP) etc.; it may also be a digital signal processor (DSP for short), Application Specific Integrated Circuit (ASIC for short), Field-Programmable Gate Array (FPGA) or other programmable logic devices, discrete gates or transistor logic devices, and discrete hardware components. The methods, steps, and logical block diagrams disclosed in the embodiments of the present application may be implemented or executed. The general-purpose processor may be a microprocessor or the processor may also be any conventional processor etc. The steps of the method disclosed in the embodiments of the present application may be directly embodied as being executed by a hardware decoding processor or by a combination of hardware and software modules in the decoding processor. The software module may be located in random access memory, flash memory or read-only memory, programmable read-only memory or electrically erasable programmable memory and registers and other mature storage media in the field. The storage medium is located in the memory 61, and the processor 60 reads the information in the memory 61, and completes the steps of the above method in combination with its hardware.

The identity identification method for fixed-point authorization provided in the embodiments of this application, and computer program products for devices and servers therefor comprise a computer-readable storage medium storing non-volatile program code executable by a processor, and a computer program is stored on the computer-readable storage medium, which executes the method described in the previous method embodiment when the computer program is run by the processor. For specific implementation, please refer to the method embodiments, which will not be repeated here.

Those skilled in the art may clearly understand that for the convenience and conciseness of the description, the specific working process of the system described above may refer to the corresponding process in the foregoing embodiments, which will not be repeated here.

The computer program product of the readable storage medium provided by the embodiment of the present application includes a computer readable storage medium storing program code. The instructions included in the program code may be used to execute the method in the previous method embodiments. For specific implementation, please refer to the method embodiments, which will not be repeated here.

If the function is implemented in the form of a software functional unit and sold or used as an independent product, it may be stored in a computer readable storage medium. Based on this understanding, the technical solution of the present application essentially or the part that contributes to the existing technology or the part of the technical solution may be embodied in the form of a software product, and the computer software product is stored in a storage medium, including several instructions to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disks or optical disks and other media that may store program codes.

Finally, it should be noted that the above-mentioned embodiments are only specific implementations of this application, which are used to illustrate the technical solution of this application, rather than limiting it. The scope of protection of the application is not limited to this, although the application has been described in detail with reference to the foregoing embodiments, and those of ordinary skill in the art should understand that any person skilled in the art familiar with the technical field within the technical scope disclosed in this application may still modify the technical solutions described in the foregoing embodiments or may easily think of changes or equivalently replace some of the technical features. However, these modifications, changes or replacements do not cause the essence of the corresponding technical solutions to deviate from the spirit and scope of the technical solutions of the embodiments of the present application, and should be covered within the protection scope of the present application. Therefore, the protection scope of this application should be subject to the protection scope of the claims.

The invention claimed is:

1. An identity identification method for a fixed-point authorization, the method comprising:
   receiving an identification request sent by a service terminal; wherein the identification request comprises terminal information and live body biological characteristic information of a target object; the terminal information comprises a terminal merchant number and terminal location information;
   determining at least one valid user of the service terminal according to the terminal information, and obtaining biological characteristic information of each valid user, wherein the valid user has a direct or an indirect authorization relationship with the service terminal;
   completing the identity identification according to the live body biological characteristic information of the target object and the biological characteristic information of each valid user, the step of determining at least one valid user of the service terminal according to the terminal information comprises:
   obtaining a belonging relationship table, wherein the belonging relationship table stores corresponding relationships between terminal merchant numbers and authorization point number information;
   searching the authorization point number information corresponding to the terminal merchant number in the belonging relationship table;
   obtaining an authorization relationship table, wherein the authorization relationship table stores corresponding relationships between authorization point number information and user accounts;
   searching for at least one user account corresponding to the authorization point number information in the authorization relationship table; and
   determining a user corresponding to the user account as the valid user of the service terminal.

2. The method according to claim 1, wherein completing the identity identification according to the live body biological characteristic information of the target object and the biological characteristic information of each valid user comprises:
   determining whether the live body biological characteristic information of the target object is directly derived from a real live body;
   if yes, determining whether a biological characteristic matching is successfully matched;
   when the biological characteristic matching is successfully matched, sending a location request to an associated terminal of each valid user successfully matched;
   receiving valid user location information sent by the associated terminal of each valid user successfully matched based on the location request; and
   completing the identity identification according to the terminal location information and each valid user location information successfully matched.

3. The method according to claim 2, wherein completing the identity identification according to the terminal location information and the valid user location information comprises:
   determining a valid area of the service terminal according to the terminal location information;
   determining whether each valid user location information successfully matched is within the valid area of the service terminal;
   if not, sending a first identity confirmation request to the service terminal, so that the service terminal returns first identity information based on the first identity confirmation request;
   receiving the first identity information returned by the service terminal, and completing the identity identification based on the first identity information;
   if yes, determining whether the valid user successfully matched in the valid area is unique;
   when the valid user successfully matched in the valid area is unique, determining the valid user successfully matched as the target object, and completing the identity identification;
   when the valid user successfully matched in the valid area is not unique, sending a second identity confirmation request to the associated terminal of each valid user successfully matched;
   determining whether at least one of second identity information sent by the associated terminal of each valid user successfully matched for the second identity confirmation request is received;
if yes, completing identity identification according to the second identity information;
if not, sending a third identity confirmation request to the service terminal, so that the service terminal returns third identity information based on the third identity confirmation request; and
receiving the third identity information returned by the service terminal, and completing identity identification based on the third identity information.

4. The method according to claim 1, and further comprising:
after the identity identification is completed, sending an identity identification result and a service request to a payment system, so that the payment system finds a payment account corresponding to the identity identification result, and completing a payment operation based on the payment account and the service request; and
generating an invoice service request according to the payment operation, and sending the invoice service request to an invoice system, so that the invoice system generates an electronic payment invoice according to the invoice service request, and sending the electronic payment invoice to an email address designated by the target object, and/or to the service terminal.

5. The method according to claim 1, and further comprising:
when the identity identification is completed, sending an identity identification result and a service request to an identity authentication system, so that the identity authentication system converts the identity identification result into personal identity information, and completing an identity authentication based on the personal identity information and the service request.

6. The method according to claim 1, and further comprising:
receiving a registration instruction sent by an associated terminal of the target object; wherein the registration instruction carries a user account of the target object;
sending prompt information to the associated terminal of the target object to prompt the target object to upload identity information; wherein the identity information comprises the biological characteristic information of the valid user;
receiving the identity information uploaded by the target object, and verifying whether the identity information is legal; and
if yes, associating and saving in a preset area the biological characteristic information of the target object and the user account of the target object.

7. The method according to claim 3, and further comprising:
generating an identity identification log, and sending the identity identification log to the associated terminal of the target object to prompt the completion of the identity identification of the target object.

8. The method according to claim 1, and further comprising:
when the biological characteristic information is a human face biological characteristic, human face biological characteristic information comprises live body human face biological characteristic information of the target object or the live body human face biological characteristic information combined with facial expression information of the target object.

9. An identity identification device for a fixed-point authorization, the device comprising a processor configured to:
to receive an identification request sent by a service terminal; wherein the identification request comprises terminal information and live body biological characteristic information of a target object; the terminal information comprises a terminal merchant number and terminal location information;
to determine at least one valid user of the service terminal according to the terminal information, and obtaining biological characteristic information of each valid user; wherein the valid user has a direct or an indirect authorization relationship with the service terminal;
to complete the identity identification according to the live body biological characteristic information of the target object and the biological characteristic information of each valid user,
the processor is further configured for:
obtaining a belonging relationship table; wherein the belonging relationship table stores corresponding relationships between terminal merchant numbers and authorization point number information;
searching the authorization point number information corresponding to the terminal merchant number in the belonging relationship table;
obtaining an authorization relationship table, wherein the authorization relationship table stores corresponding relationships between authorization point number information and user accounts;
searching for at least one user account corresponding to the authorization point number information in the authorization relationship table; and
determining a user corresponding to the user account as the valid user of the service terminal.

10. A server comprising,
a processor;
a memory operable with the processor; and
a computer program stored on the memory, and the computer program having instructions executable by the processor comprising:
receiving an identification request sent by a service terminal, wherein the identification request comprises terminal information and live body biological characteristic information of a target object, the terminal information comprises a terminal merchant number and terminal location information;
determining at least one valid user of the service terminal according to the terminal information, and obtaining biological characteristic information of each valid user; wherein the valid user has a direct or an indirect authorization relationship with the service terminal;
completing the identity identification according to the live body biological characteristic information of the target object and the biological characteristic information of each valid user,
the step of determining at least one valid user of the service terminal according to the terminal information comprises:
obtaining a belonging relationship table; wherein the belonging relationship table stores corresponding relationships between terminal merchant numbers and authorization point number information;
searching the authorization point number information corresponding to the terminal merchant number in the belonging relationship table;

obtaining an authorization relationship table, wherein the authorization relationship table stores corresponding relationships between authorization point number information and user accounts;

searching for at least one user account corresponding to the authorization point number information in the authorization relationship table; and determining a user corresponding to the user account as the valid user of the service terminal.

11. A non-transitory computer storage medium, comprising executable instructions, the executable instructions, when being executed by a processor of an electronic device, cause the electronic device to perform a method comprising:

receiving an identification request sent by a service terminal, wherein the identification request comprises terminal information and live body biological characteristic information of a target object, the terminal information comprises a terminal merchant number and terminal location information;

determining at least one valid user of the service terminal according to the terminal information, and obtaining biological characteristic information of each valid user; wherein the valid user has a direct or an indirect authorization relationship with the service terminal;

completing the identity identification according to the live body biological characteristic information of the target object and the biological characteristic information of each valid user, the step of determining at least one valid user of the service terminal according to the terminal information comprises:

obtaining a belonging relationship table; wherein the belonging relationship table stores corresponding relationships between terminal merchant numbers and authorization point number information;

searching the authorization point number information corresponding to the terminal merchant number in the belonging relationship table;

obtaining an authorization relationship table, wherein the authorization relationship table stores corresponding relationships between authorization point number information and user accounts;

searching for at least one user account corresponding to the authorization point number information in the authorization relationship table; and determining a user corresponding to the user account as the valid user of the service terminal.

\* \* \* \* \*